(12) United States Patent
Hamann

(10) Patent No.: US 6,642,476 B2
(45) Date of Patent: Nov. 4, 2003

(54) APPARATUS AND METHOD OF FORMING ORIFICES AND CHAMFERS FOR UNIFORM ORIFICE COEFFICIENT AND SURFACE PROPERTIES BY LASER

(75) Inventor: Christoph Hamann, Williamsburg, VA (US)

(73) Assignee: Siemens Automative Corporation, Auburn Hills, MI (US)

( * ) Notice: Subject to any disclaimer, the term of this patent is extended or adjusted under 35 U.S.C. 154(b) by 23 days.

(21) Appl. No.: 09/909,788

(22) Filed: Jul. 23, 2001

(65) Prior Publication Data

US 2003/0015503 A1 Jan. 23, 2003

(51) Int. Cl.⁷ ............................................. B23K 26/38
(52) U.S. Cl. .................................................. 219/121.7
(58) Field of Search ....................... 219/121.67, 121.7, 219/121.71, 121.72, 121.77

(56) References Cited

U.S. PATENT DOCUMENTS

| | | | |
|---|---|---|---|
| 3,953,706 A | 4/1976 | Harris et al. | 219/121 L |
| 4,059,876 A | 11/1977 | Ditto | 29/156.7 A |
| 4,160,894 A | 7/1979 | Stemmler et al. | 219/121 L |
| 4,370,540 A | 1/1983 | Davis et al. | 219/121 LM |
| 4,694,139 A * | 9/1987 | Roder | |
| 4,818,834 A * | 4/1989 | Rupert | |
| 4,911,711 A | 3/1990 | Telfair et al. | 606/5 |
| 5,043,553 A | 8/1991 | Corfe et al. | 219/121.7 |
| 5,093,548 A | 3/1992 | Schmidt-Hebbel | 219/121.71 |
| 5,163,934 A | 11/1992 | Munnerlyn | 606/5 |
| 5,237,148 A | 8/1993 | Aoki et al. | 219/121.7 |
| 5,523,544 A | 6/1996 | Hertzel et al. | 219/121.7 |
| 5,607,606 A | 3/1997 | Mori et al. | 219/121.67 |
| 5,632,083 A | 5/1997 | Tada et al. | 29/827 |
| 5,885,199 A * | 3/1999 | Shao | |
| 6,172,331 B1 | 1/2001 | Chen | 219/212.71 |
| 6,229,113 B1 | 5/2001 | Brown | 219/121.7 |
| 6,264,486 B1 * | 7/2001 | Jiang et al. | |

FOREIGN PATENT DOCUMENTS

| | | |
|---|---|---|
| GB | 2 328 894 | 3/1999 |
| JP | 40923066 A * | 9/1997 |

* cited by examiner

Primary Examiner—Samuel M. Heinrich

(57) ABSTRACT

A device and method that can form a plurality of chamfered orifices where the orifices are consistent dimensionally, such as, for example, the diameter, the surface roughness, and/or the geometry of the chamfers. The device includes a laser light source that emits generally coherent light along an axis towards a workpiece. The device also includes a splitter assembly that directs a first portion and a second portion of the generally coherent light about the axis such that at least one orifice and at least one chamfer is formed in the work piece. The device is configured such that it can form an orifice and at least one chamfer having a surface roughness of less than two microns and an orifice coefficient ratio at least 0.6. The preferred method includes providing at least a first beam and a second beam that are emitted from the laser light source, and forming at least one orifice in the work piece by directing at least one of the first and second beams towards the workpiece. The method further includes targeting the other of the at least one of the first and second beams to form the at least one chamfer in the at least one orifice to provide for an orifice coefficient of at least 0.6.

26 Claims, 2 Drawing Sheets

APPARATUS AND METHOD OF FORMING ORIFICES AND CHAMFERS FOR UNIFORM ORIFICE COEFFICIENT AND SURFACE PROPERTIES BY LASER

BACKGROUND OF THE INVENTION

A fuel injector is believed to deliver fuel at specific time intervals and in precise amounts to intake valves and/or the combustion chamber of an internal combustion engine. It is further believed that fuel flowing through a fuel injector typically exits at a nozzle end of the fuel injector, and that the nozzle end typically has a disk with one or more orifices disposed thereon. It is believed that the resulting spray direction, spray particle size, spray mass flow, and spray pattern from the nozzle are a function of, among other variables, the geometry of the orifices.

An orifice is believed to be formed by drilling through a work piece that can be of any shape, including a flat piece (or disk). There are many known methods of drilling orifices for a fuel injector, including mechanical punching and electric discharge machining (EDM). It is believed that these methods are only capable of forming orifices of 150 to 200 microns in diameter or larger. Moreover, it is also believed that these methods are incapable of forming orifices with entry and exit angles. It is further believed that future low emission standards will require smaller orifices for smaller fuel spray droplets and shorter fuel spray duration. It is therefore believed that it will be technically infeasible and/or cost prohibitive to manufacture orifices using known methods once more restrictive emission standards are adopted.

It is also believed that fuel flow variability from orifices cut using laser beam manufacturing methods is still relatively high. It is further believed that fuel flow variability in laser manufactured orifices is generated, at least in part, by the lack of reproducibility of the orifice entry geometry, or chamfer (i.e., the orifice coefficient is not sufficiently reproducible). In percussion drilling, it is believed that the workpiece and the laser beam are in fixed positions while the pulsed beam impinges on the workpiece. Due to the random nature of metal expulsion, percussion drilling is believed to generate a non-circular orifice or a non-cylindrical orifice. Moreover, it is believed that the inlet geometry is not defined. In trepanning, it is believed that the workpiece is fixed while the laser beam first drills a penetration hole and then spirals out to a desired hole diameter. Helical drilling is similar to trepanning but without the penetration hole. Trepanning or helical drilling is believed to be more precise than percussion drilling, but it is also believed to leave the laser entry side of the orifice undefined.

SUMMARY OF THE INVENTION

The present invention provides a laser-machining device that can form a plurality of orifices with chamfers where the orifices are consistent dimensionally, such as, for example, the diameter, the surface roughness, and/or the geometry of the chamfers. In a preferred embodiment, the device includes a laser light source that emits generally coherent light along an axis towards a workpiece. The device also includes a splitter assembly that directs a first portion and a second portion of the generally coherent light about the axis such that at least one orifice and at least one chamfer is formed in the work piece. The device is configured such that it can form at least one orifice and at least one chamfer having a surface roughness of less than two microns and an orifice coefficient ratio of at least 0.6.

The present invention further provides a method of forming a plurality of dimensionally consistent chamfered orifices in a workpiece by a laser light, the orifice being disposed along an orifice axis, and the work piece has a first surface and a second surface. In particular, the method can be achieved by providing at least a first beam and a second beam that are emitted from the laser light source; forming at least one orifice in the work piece by directing at least one of the first and second beams towards the workpiece; and targeting the other of the at least one of the first and second beams to form the at least one chamfer in the at least one orifice to provide for an orifice coefficient of at least 0.6.

BRIEF DESCRIPTIONS OF THE DRAWINGS

The accompanying drawings, which are incorporated herein and constitute part of this specification, illustrate an embodiment of the invention, and, together with the general description given above and the detailed description given below, serve to explain the features of the invention.

DETAILED DESCRIPTION OF THE PREFERRED EMBODIMENT

Figure 1:
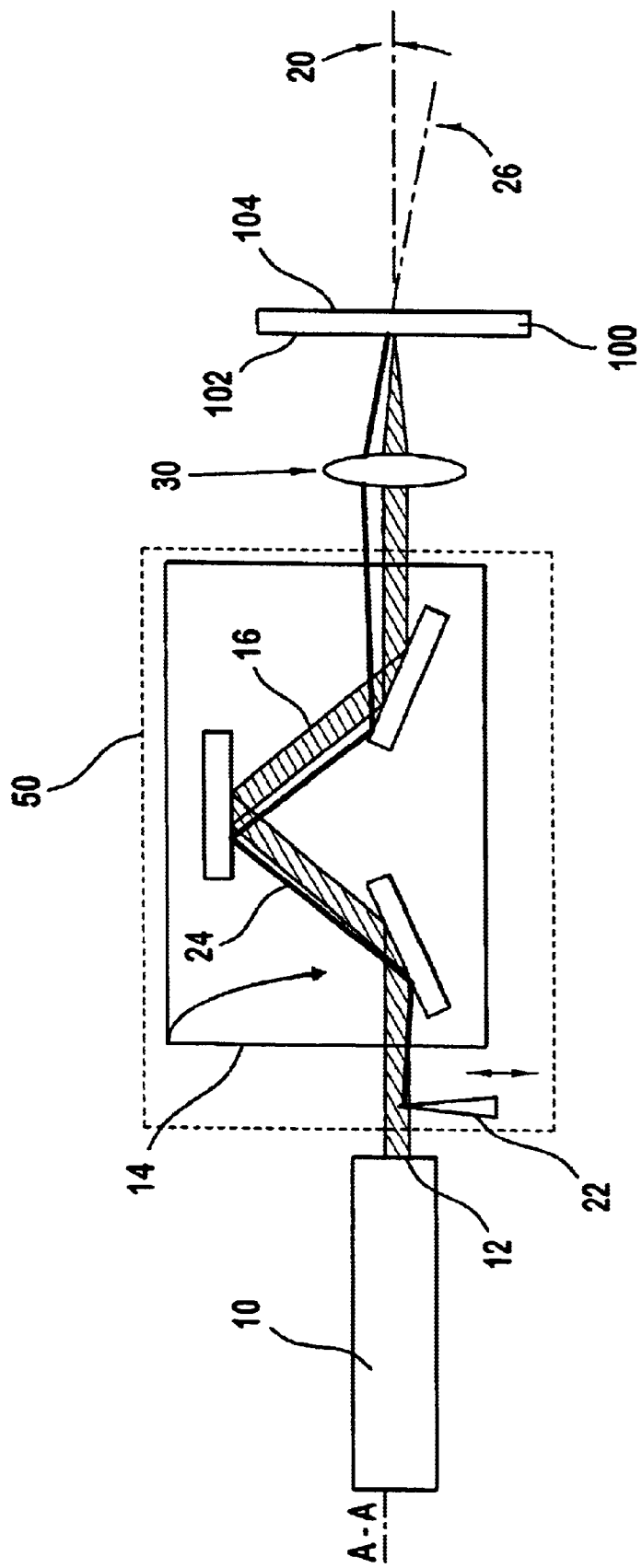
FIG. 1 is a schematic view of the components required to form an orifice according a preferred embodiment.
Figure 2:
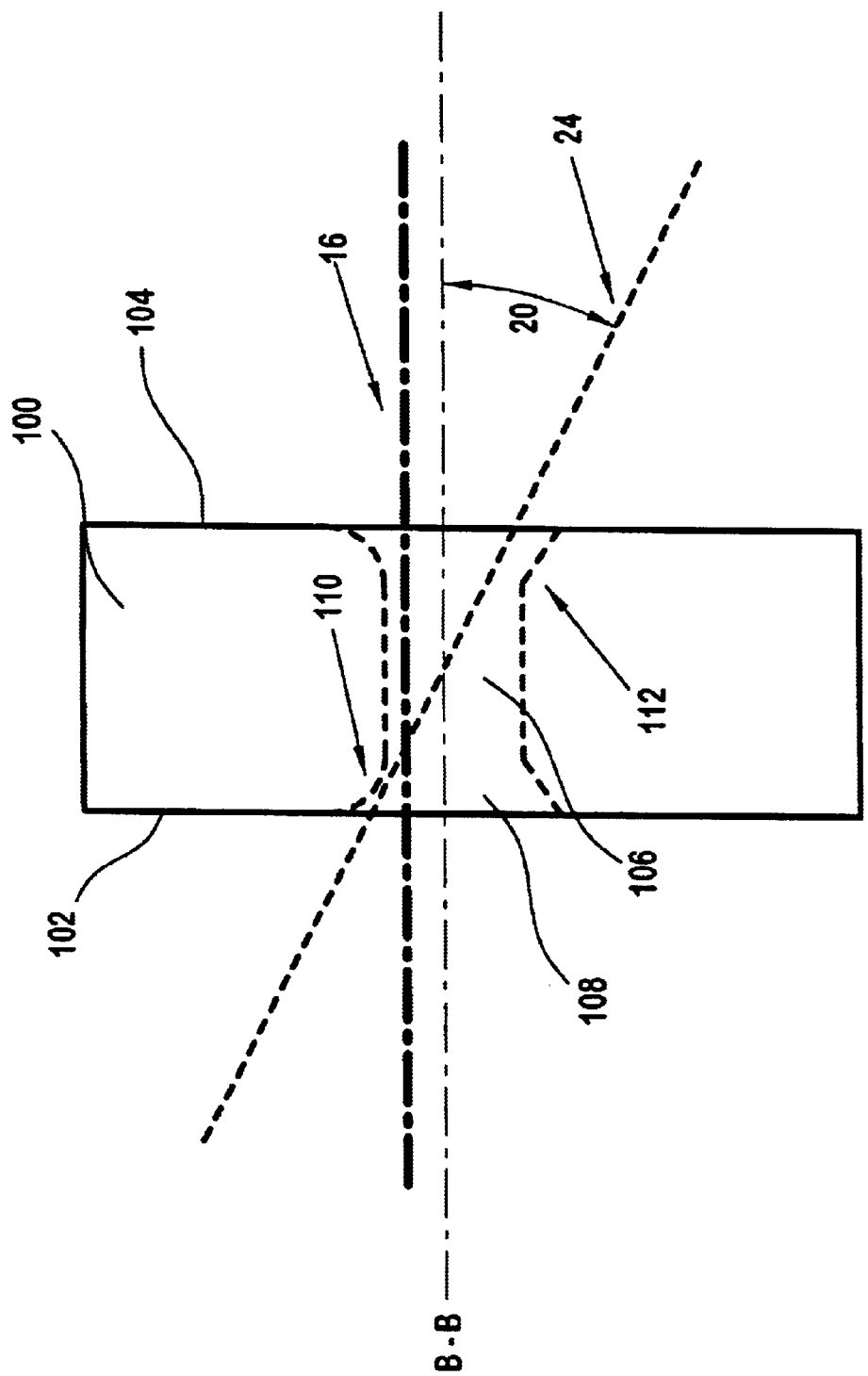
FIG. 2 is an illustration of the orifice and chamfer formed in a workpiece by the preferred embodiment shown in FIG. 1.

Referring to FIGS. 1 and 2, the laser machining apparatus includes a laser light source 10 that provides a generally coherent light beam 12 along the beam's axis A—A. The apparatus also includes a splitter assembly 50 that includes, preferably, a rotatable beam reflector 14, to direct a first portion of light 16 from the light beam 12 to a work piece 100 via a focusing assembly 30 at a first angle of incidence 20 relative to the beam's axis A—A during a first time interval to form at least one of an orifice 106 and a chamfer 108. The assembly 50 further includes an adjustable beam splitter 22, such as, for example, a prism, to direct another portion of the light beam 24 at a second angle of incidence 26, which can be different from the first angle of incidence 20, to form the other of the at least one of an orifice 106 and a chamfer 108 in the work piece 100 during a second time interval that overlaps a portion of the first time interval. The first and second time intervals can differ in duration, such that the first time interval can be greater than the second time interval or, conversely, the second time interval is greater than the first time interval. That is, the light corresponding to one of the first and second time intervals can be initiated first while the light corresponding to the other time interval is not initiated until a time interval has passed such that both time intervals end at the same instant in time. Preferably, the first and second time intervals are initiated substantially simultaneously and can terminate at the same time or at different intervals.

The first surface 102 of the workpiece 100 can be either generally parallel or generally non-parallel to the second surface 104. Preferably, two chamfers, one for each end of the orifice, are formed.

The shape for chamfers 108 of the orifice 106 can be, for example, a bell shaped chamfer 110 or a conical shaped chamfer 112. For example, an orifice may have two substantially bell shaped chamfer 110 for the respective ends of the orifice. Alternatively, the orifice may have two conical shaped chamfer 112 or a combination of conical shaped chamfer 112 at one end and a bell shaped chamfer at the other end. A conical shaped chamfer 112 can be defined by a cone whose walls diverge at a constant angle and whose vertex is disposed along an axis of the orifice. A bellshaped chamfer 110 consists of two sections. At a first end, the walls of the bell diverge at a relatively large angle but the degree of divergence tapers off at the second end. At the second end, the divergence angle of the walls of the chamfer is very small. Although two examples are given, it should be noted, however, that the chamfer could be configured into any cross-sectional shape that, under actual flow conditions, will produce an orifice coefficient of at least 0.6. As used here, the term "orifice coefficient," or "coefficient of discharge", is a function of, among other variables, the ratio of the cross sectional area of the inlet with respect to the cross sectional area of the orifice itself as well as the Reynolds Number of the fluid flow through the orifice. The orifice coefficient is believed to be an indicator of frictional loss incurred by flow within an orifice.

In operation, at least a first beam 16 and a second beam 24 are emitted from the laser light source 10 towards the workpiece 100. The laser light source 10 can be either a gas or a solid-state laser. The at least a first beam 16 and a second beam 24 are rotated an angle 20 with respect to the longitudinal axis A—A. The at least one orifice 106 is formed in the workpiece 100 with at least one of the first and second beams 16, 24 during a first time interval; and at least one chamfer 108 is formed in the workpiece 100 with the other of the first and second beams 16, 24 during a second time interval. Preferably, the second time interval overlaps a portion of the first time interval. The first and second beams 16, 24 can be directed to the workpiece 100 at different power densities. Preferably, the power density or irradiance of the laser light source(s) should be less than $1\times10^{12}$ Watts per centimeter-squared (Terawatt/cm$^2$) and at least $1\times10^6$ Watts per centimeter-squared (Gigawatt/cm$^2$). Preferably, the laser light source(s) can be a copper vapor laser or a frequency doubled neodymium: yttrium, aluminum, garnet (Nd: YAG) laser having a wavelength between approximately 511 nanometer and approximately 578 nanometer.

In one variation of this method, one of the first and second beams 16, 24 is directed toward the workpiece 100 at a first power density or irradiance, while the other of the first and second beams 16, 24 is directed to the workpiece 100 at a second power density or irradiance, and at least one of the first and second beams 16, 24 is rotated at an angle of incidence 20 about axis B—B to form an orifice 106 and/or a chamfer 108 in the workpiece 100. In another variation, one of the first and second beams 16, 24 is aimed toward the workpiece 100 at a first angle of incidence 20 to form an orifice 106 on the workpiece 100, and the other of the first and second beams 16, 24 is aimed towards a perimeter of the orifice 106 at a second angle of incidence 26 to form a chamfer 108 on the orifice 106. One or both of the first and second beams 16, 24 can be focused to a desired irradiance and fluence, and can be focused to a target at or below one of the first and second surfaces 102, 104.

In a further variation, at least one of the first and second beams 16, 24 can be rotated about the axis B—B of the orifice 106 so as to generate at least part of a curved surface of a cone that has its vertex between the first and second surfaces 102, 104 of the workpiece 100. Also, at least one of the first and second beams 16, 24 can be pulsewidth modulated. Preferably, the laser light source 10 should provide about 0.3 milliJoules with a pulsewidth of about 25 nanoseconds or less. Also, the laser light 12 should have a wavelength of about 1.0 microns or less with an a fluence at focus of about $10^4$ Joules per centimeter-squared and an irradiance at focus of about 1 Gigawatt to 1 Terawatt per centimeter-squared.

The preferred embodiments herein described can be used to form orifices for fuel injectors. Other applications of the preferred embodiments may include inkjet or laser printers, microcircuit boards, micro-machined devices, and any other devices, which require a plurality of orifices of consistent dimensionality including surface roughness, entry and exit geometry that allows for an orifice coefficient that is believed to be at least 0.6.

While the present invention has been disclosed with reference to certain embodiments, numerous modifications, alterations and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

I claim:

1. A laser machining device to form at least one orifice with at least one chamfer, the device comprising:
    a laser light source that emits generally coherent light along an axis towards a workpiece;
    a splitter assembly that directs a first portion and a second portion of the generally coherent light about the axis such that at least one orifice and at least one chamfer is formed in the work piece, at least one of the orifice and the at least one chamfer having a surface roughness of less than two microns and an orifice coefficient ratio of at least 0.6.

2. The device as claimed in claim 1, wherein the splitter assembly further comprises a reflective beam rotator.

3. The device as claimed in claim 1, wherein the splitter assembly further comprises a prism.

4. The device as claimed in claim 1, wherein the workpiece comprises at least a first surface and a second surface.

5. The laser machining apparatus as claimed in claim 4, wherein the first surface is generally parallel to the second surface.

6. The laser machining apparatus as claimed in claim 4, wherein the first surface is generally non-parallel to the second surface.

7. The laser machining apparatus as claimed in claim 1, wherein the at least one chamfer includes a cone having a vertex of the general cone disposed on a longitudinal axis of the at least one orifice.

8. The laser machining apparatus as claimed in claim 1, wherein the at least one chamfer includes a bellmouth shaped surface disposed on a longitudinal axis of the at least one orifice.

9. A method of forming at least one orifice and at least one chamfer in a workpiece by a laser light, the orifice disposed along an orifice axis, the work piece having a first surface and a second surface, the method comprising:
    providing at least a first beam and at least a second beam that are emitted from the laser light source along an axis;
    forming at least one orifice in the work piece by directing at least one of the first and second beams towards the workpiece; and
    targeting the other of the at least one of the first and second beams to form the at least one chamfer of the at least one orifice to provide for an orifice coefficient of at least 0.6.

10. The method according to claim 9, wherein the forming further comprises controlling a power of at least one of the first and second beams during a first time interval.

11. The method according to claim 10, wherein the targeting further comprises controlling a power of the other of the at least one of the first and second beams during a second time interval.

12. The method according to claim 11, wherein the two time intervals are substantially equal.

13. The method according to claim 9, wherein the two time intervals occur at the same time.

14. The method according to claim 9, wherein the axis comprises an axis generally coincident with the orifice axis.

15. The method according to claim 9, wherein the first surface comprises a surface generally parallel to the second surface.

16. The method according to claim 9, wherein the first surface comprises a surface generally non-parallel to the second surface.

17. The method according to claim 9, wherein the providing further comprises:
    directing at least one of the first and second beams to a workpiece at a first power density;
    directing the other of the first and second beams to the workpiece at a second power density; and
    rotating at least one of the first and second beams to form the at least one orifice and at least one chamfer workpiece.

18. The method according to claim 9, wherein the providing further comprises:
    aiming at least one of the first and second beams toward a workpiece at a first angle of incidence to form at least one orifice on the workpiece; and
    aiming the other of the first and second beams towards a perimeter of the at least one orifice at a second angle of incidence to form at least a chamfer for the at least one orifice.

19. The method as claimed in claim 18, wherein the aiming further comprises focusing at least one of the first and second beams to a desired irradiance and fluence.

20. The method as claimed in claim 18, wherein the aiming further comprises focusing at least one of the first and second beam to a target at or below one of the first and second surfaces.

21. The method as claimed in claim 9, wherein the forming and the targeting further comprise forming at least one orifice having a surface roughness of less than two microns and forming at least one chamfer having a surface roughness of less than two microns.

22. The method as claimed in claim 9, wherein the providing further comprises rotating at least one of the first and second beams about the axis of the at least one orifice so as to generate at least part of a curved surface of a cone that has its vertex between the first and second surfaces of the workpiece.

23. The method according to claim 9, wherein the providing further comprises pulsewidth modulating at least one of the first and second beams.

24. The method according to claim 9, wherein the providing further comprises a laser light source of about 0.3 milliJoules with a pulsewidth of about 25 nanoseconds or less.

25. The method according to claim 9, wherein the providing further comprises providing laser light having a wavelength of about 1.0 microns or less with a fluence at focus of about $10^4$ Joules per centimeter-squared and an irradiance at focus of about 1 Gigawatt per centimeter squared to about 1 Terawatt per centimeter-squared.

26. The method according to claim 9, wherein the providing further comprises rotating at least one of the first and second beams about the axis of the at least one orifice so as to generate at least a portion of a bellmouth shaped surface that defines the at least one chamfer.

* * * * *